(12) United States Patent
Russell et al.

(10) Patent No.: US 7,496,843 B1
(45) Date of Patent: Feb. 24, 2009

(54) WEB CONSTRUCTION FRAMEWORK CONTROLLER AND MODEL TIERS

(75) Inventors: Nick S. Russell, Shawnee, KS (US); Joshua D. Turner, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 484 days.

(21) Appl. No.: 10/910,870

(22) Filed: Aug. 4, 2004

(51) Int. Cl.
G06F 17/00 (2006.01)
(52) U.S. Cl. ............... 715/273; 715/234; 715/248
(58) Field of Classification Search ......... 715/500, 715/513, 522, 526, 530, 200, 234, 248, 255, 715/273
See application file for complete search history.

(56) References Cited

U.S. PATENT DOCUMENTS

| | | | |
|---|---|---|---|
| 6,233,620 B1 * | 5/2001 | Gish | 709/203 |
| 6,272,555 B1 * | 8/2001 | Gish | 719/315 |
| 6,272,556 B1 * | 8/2001 | Gish | 719/315 |
| 6,304,893 B1 * | 10/2001 | Gish | 709/203 |
| 6,324,524 B1 | 11/2001 | Lent et al. | |
| 6,434,598 B1 * | 8/2002 | Gish | 709/203 |
| 6,453,337 B2 | 9/2002 | Miller et al. | |
| 6,463,461 B1 | 10/2002 | Hanson et al. | |
| 6,523,063 B1 | 2/2003 | Miller et al. | |
| 7,107,285 B2 | 9/2006 | von Kaenel et al. | |
| 7,133,845 B1 * | 11/2006 | Ginter et al. | 705/51 |
| 7,237,268 B2 * | 6/2007 | Fields | 726/27 |
| 2002/0035486 A1 * | 3/2002 | Huyn et al. | 705/3 |
| 2002/0112154 A1 * | 8/2002 | Wallace | 713/153 |
| 2002/0138633 A1 | 9/2002 | Angwin et al. | |
| 2002/0152378 A1 * | 10/2002 | Wallace et al. | 713/168 |
| 2003/0048296 A1 * | 3/2003 | Cullen et al. | 345/744 |
| 2003/0078960 A1 | 4/2003 | Murren et al. | |
| 2003/0191677 A1 | 10/2003 | Akkiraju et al. | |
| 2004/0117358 A1 | 6/2004 | von Kaenel et al. | |
| 2004/0177010 A1 | 9/2004 | Francis, Jr. | |
| 2004/0216044 A1 | 10/2004 | Martin et al. | |
| 2004/0216045 A1 | 10/2004 | Martin et al. | |
| 2004/0221256 A1 | 11/2004 | Martin et al. | |
| 2004/0221260 A1 | 11/2004 | Martin et al. | |
| 2004/0230825 A1 * | 11/2004 | Shepherd et al. | 713/200 |

(Continued)

OTHER PUBLICATIONS

Taylor, Art, "J2EE and Beyond: Design, Develop, and Deploy World-Class Java(TM) Software", Dec. 23, 2002, Prentice Hall, accessed through Safari books on line, relevant sections supplied with p. Nos. 1-15 entered by hand.

(Continued)

*Primary Examiner*—Stephen S Hong
*Assistant Examiner*—Gregory J Vaughn

(57) ABSTRACT

A system for constructing a controller and a model portion of web applications is provided. The system includes a model component to provide access to a data store and a controller component to receive a request from a client application and generate a response in cooperation with the model component. The response used by a presentation tier for communicating with the client application. The controller component includes a flow file template operable to be extended to a flow file that defines a web application flow sequence. The controller also includes a java servlet template to be extended to a java servlet to receive the request and process the request based on the flow file. The java servlet template is also extendable to a java servlet to access a data through the first component to generate the response.

30 Claims, 4 Drawing Sheets

U.S. PATENT DOCUMENTS

2005/0138650 A1* 6/2005 Hon et al. .................. 719/330
2005/0177545 A1* 8/2005 Buco et al. ..................... 707/1

OTHER PUBLICATIONS

Office Action dated Sep. 8, 2006, 11 pages, U.S. Appl. No. 10/910,871, filed Aug. 4, 2004.

Office Action dated Feb. 6, 2007, 12 pages, U.S. Appl. No. 10/910,871, filed Aug. 4, 2004.

Office Action dated Jul. 26, 2007, 14 pages U.S. Appl. No. 10/910,871, filed Aug. 4, 2004.

Russell, Nick S., et al., "Web Construction Framework Presentation Tier", U.S. Appl. No. 10/910,871, filed Aug. 4, 2004.

Office Action dated Jan. 8, 2008, 15 pages, U.S. Appl. No. 10/910,871, filed Aug. 4, 2004.

Notice of Allowance and Fees Due, 6 pages, entitled "Web Construction Framework Presentation Tier," U.S. Appl. No. 10/910,871, filed Aug. 4, 2004 (IDF 2794 (4000-21400)).

* cited by examiner

WEB CONSTRUCTION FRAMEWORK CONTROLLER AND MODEL TIERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software, and more particularly, but not by way of limitation, to a web application construction framework.

BACKGROUND OF THE INVENTION

Many corporations provide their business computer software or business applications as web applications. In this case, the client browser, such as a Microsoft Explorer or Netscape Navigator computer program, is installed on a personal computer. The client browser acts as a thin client and provides requests and inputs and receives pages which the client browser displays. The business rules or application specific behavior associated with the business application may be provided by a web application which executes on a server computer. The web application receives requests from the client browser in hypertext markup language (HTML) format and returns HTML formatted documents responsive to the requests for display on the client browser. The data required by the web application may be provided by a back-end data store system.

Software reuse refers to creating new computer programs or software which contains at least a portion of software which already exists and was not developed specifically for the new computer program. Software reuse is a useful strategy to reduce the cost of developing new software and to shorten development cycles. Software reuse may increase the reliability of software because the reused software may have been more thoroughly exercised or tested by application users. Several software development methodologies and programming languages directly support software reuse, for example, an object oriented programming development methodology, a JAVA programming language, and a C++ programming language.

SUMMARY OF THE INVENTION

A web construction framework for constructing web applications is provided. The web construction framework includes a model component, a controller component, and a presentation component. The model component is operable to provide access to a data store. The controller component is operable to receive a request from a client application and generate a response in cooperation with the model component. The controller component includes a flow file template and a JAVA servlet template. The flow file template is operable to be extended to a flow file that defines a web application flow sequence. The JAVA servlet template is operable to be extended to a JAVA servlet to receive the request and process the request based on the flow file. The JAVA servlet template is also operable to be extended to a JAVA servlet to access data through the first component to generate the response.

The web construction framework also includes the presentation component that is operable to receive the response from the controller component for communicating with the client application. The presentation component includes an input file, a template and a script. The input file defines a plurality of fields, each field having a type used at least for data validation. The template is operable to be extended to create a JAVA server page. The script is operable in response to a request from a client application to construct a graphical user interface using the template for communication to the client application for user input via the graphical user interface. The script uses the JAVA server page and the input file field definitions to validate the fields as the user inputs via the graphical user interface at the client application.

According to one embodiment, the present disclosure provides a method of constructing a controller and a model portion of a web application using a web construction framework. The method includes developing a form class derived from a generic form class, at least a part of the generic form class defined as part of a JAVA servlet. The method provides for developing a flow file which is derived from a flow file template, the flow file defining a control flow of the web application. The method also includes precompiling the JAVA server page.

In another embodiment, a system for constructing a controller and a model portion of web applications is provided. The system includes a model component to provide access to a data store and a controller component to receive a request from a client application and generate a response in cooperation with the model component. The response is used by a presentation tier for communicating with the client application. The controller component includes a flow file template operable to be extended to a flow file that defines a web application flow sequence. The controller also includes a JAVA servlet template to be extended to a JAVA servlet to receive the request and process the request based on the flow file. The JAVA servlet template is also extendable to a JAVA servlet to access a data through the first component to generate the response.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

A web application may comprise a number of features which are common to other web applications developed by an enterprise. The existence of common features provides an opportunity to reuse software, but simple reuse of software may impose unwanted limitations on new development. A desirable product is a web application construction framework which supports development of powerful web applications wherein common functionality is not redeveloped for each new web application. The present disclosure provides a web application construction framework which may provide high levels of reuse when developing new web applications.

Figure 1:
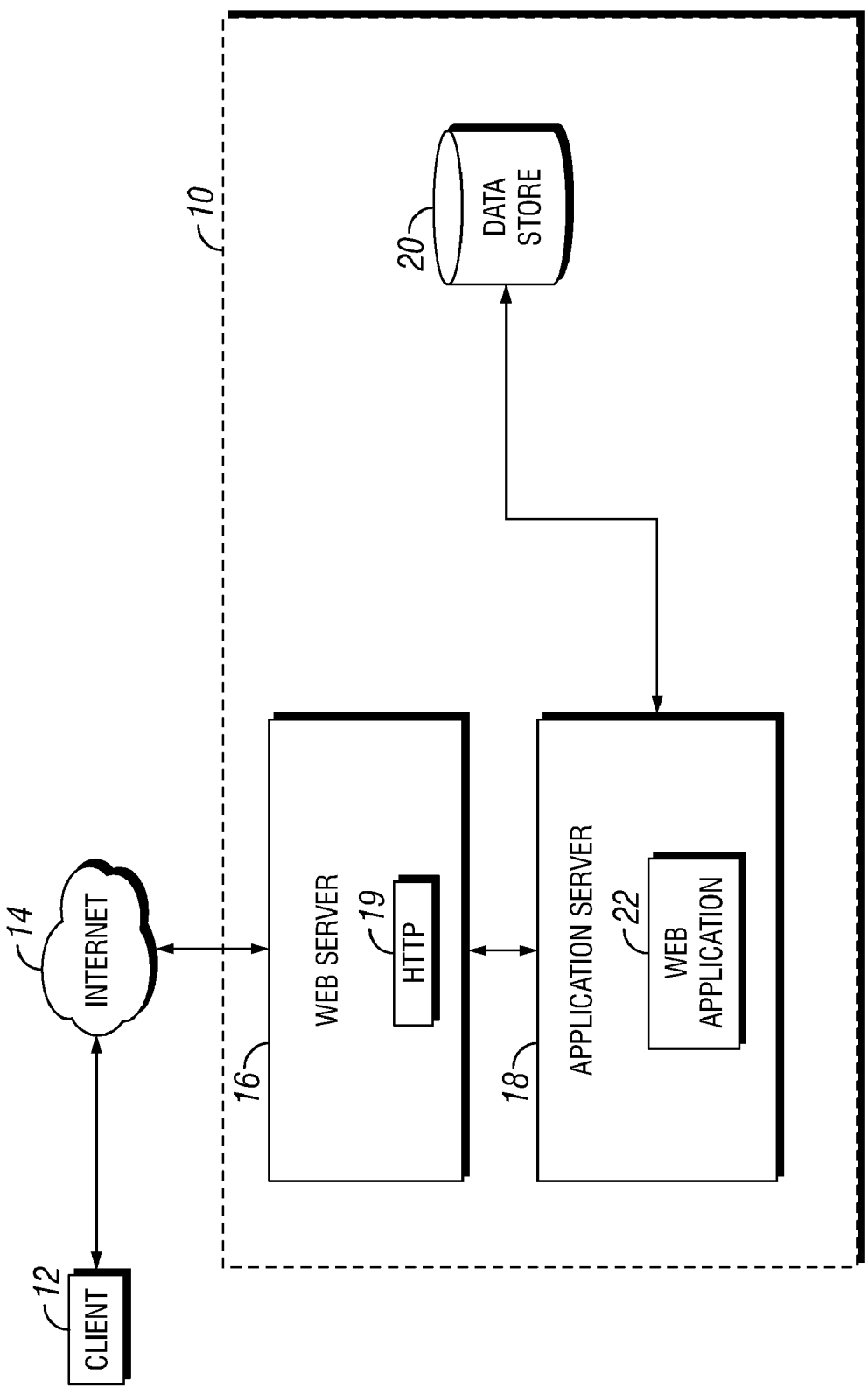
FIG. 1 is a block diagram of a web application system in communication with a client via an Internet.

Turning now to FIG. 1, a block diagram of a web application system 10 built according to the web application construction framework of the present disclosure is depicted. A client 12 communicates with the web application system 10 via the Internet 14 using an HTML transport protocol (HTTP) service 19. The client 12 sends a request to the web application system 10. The web application system 10 builds a response to the request and returns the response to the client 12 via the HTTP service 19. The content of the response is contained in an HTML document or file.

The web application system 10 comprises a web server 16, an application server 18, and a back-end data store 20. The back-end data store 20 may comprise a relational database, a directory service, a file system, or other data storage mechanism well known to one skilled in the art. The web server 16 receives HTTP requests from the HTTP service 19 of the client 12 and returns HTML responses to HTTP service 19 of the client 12. The web server 16 is a software application which may execute on a general purpose computer system. General purpose computer systems will be discussed in greater detail hereinafter. The web server 16 may be provided by a software vendor. The application server 18 is a software application which may execute on a general purpose computer system. The application server 18 may be provided by a software vendor. The application server 18 executes one or more web applications 22 which provides specific services or capabilities. The web application 22 is in communication with the back-end data store 20 to read and write enterprise data. The back-end data store 20 may be composed of multiple independent back-end data stores 20.

Figure 2:
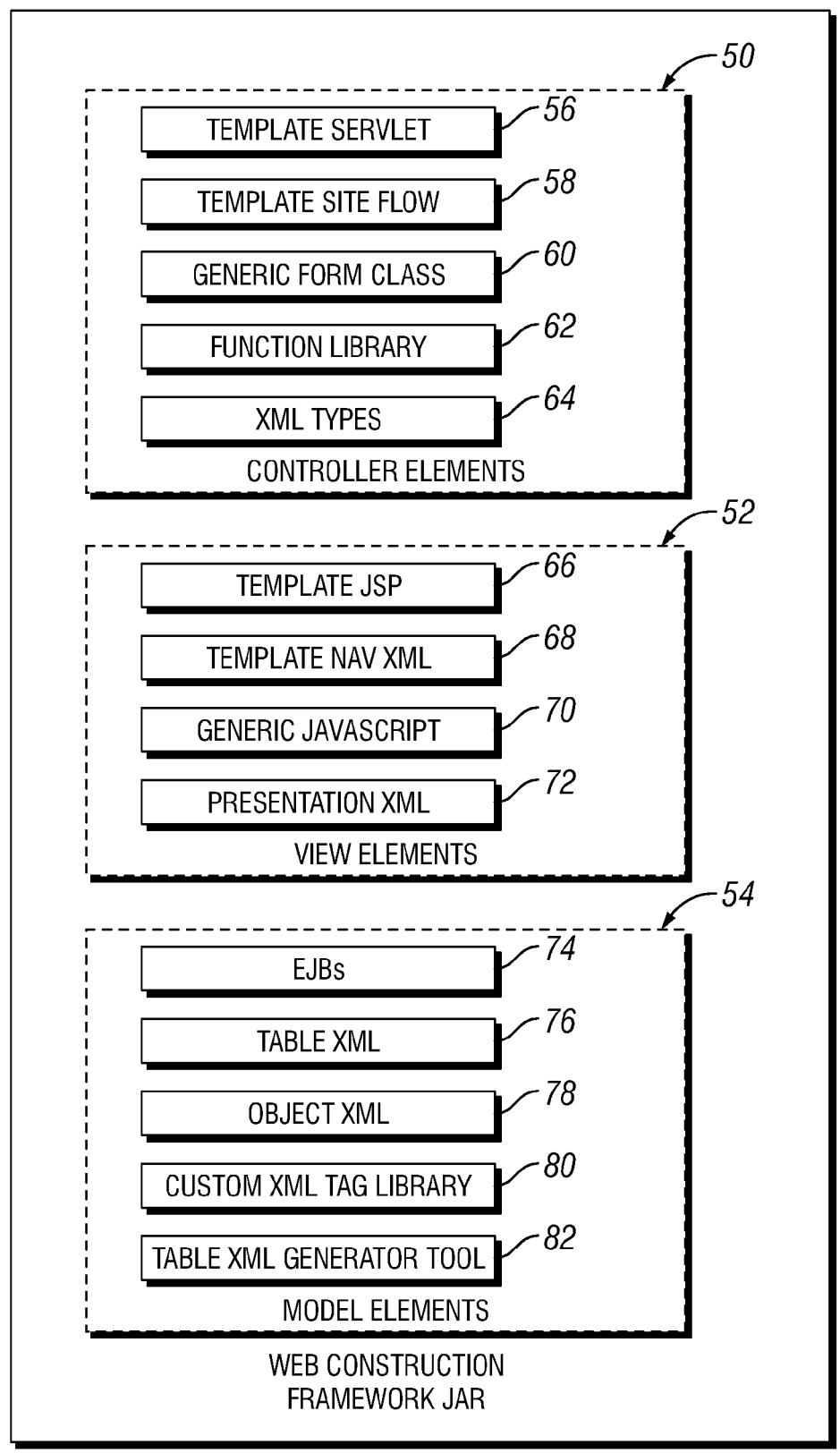
FIG. 2 is a diagram of a JAVA archive containing the architectural elements of the web construction framework.

Turning now to FIG. 2, a diagram depicts the contents of a JAVA archive (JAR) containing the architectural elements of the web application construction framework. These architectural elements may be divided into controller elements 50, view elements 52, and model elements 54, with reference to the general web application functions supported by the architectural elements. These architectural elements may be stored in files. A developer creating a new web application may use the architectural elements by copying and using architectural elements as is, by copying and modifying the architectural elements for the specific needs of the new web application, or by subclassing from the architectural elements to add specific behaviors.

The controller elements 50 include a template servlet 56, a template site flow extensible markup language (XML) file 58, a generic form class 60, a function library 62, and an XML types file 64. The view elements 52 include a template JAVA server page (JSP) 66, a template site navigation XML file 68, a generic JavaScript file 70, and a presentation XML file 72. The model elements 54 include a plurality of enterprise JAVA beans (EJBs) 74, a data store table XML file 76, a data store object XML file 78, a custom XML tag library 80, and a data store table XML file generator tool 82.

The template servlet 56 provides basic JAVA servlet functionality which the developer extends by adding code. The template site flow XML file 58 contains little content, as the site flow XML definitions are specific to the web application 22. The template site flow XML file 58 does provide some support for the back-button functionality described below. The developer adds XML definitions identifying acceptable universal reference locator (URL) navigational pathways through the web application 22. The generic form class 60 provides basic functionality for responding to input from a form-like view or screen displayed by the client 12. The developer extends or subclasses the generic form class 60 and adds extended functionality specific to the subject web application 22. The function library 62 provides a number of utilities which are commonly employed by the web application 22. Some of these functions may include email templates for notifying administrators of actions, and cryptography functions to support secure communications. The function library 62, for example, may provide support for a data encryption standard (DES) standard, a triple DES standard, a PGP encryption, and a Blowfish encryption. New functions may be added to the function library 62 by the developer and thereafter are available to future developers. The function library 62 provides support for the back-button functionality described below. The XML types file 64 defines field types which define the input that may be received from fill-in boxes. For most web applications 22 the XML types file 64 may be reused without modification. If, however, the web application 22 employs a field type which is not defined in the XML types file 64, the XML types file 64 is extended by adding the new field type XML definition.

The template JSP 66 is modified by the developer to provide the particular needs of the web application 22. The template site navigation XML file 68 is extended by the developer to define a user interface using XML. The generic JavaScript file 70 is used without modification by the developer. The presentation XML file 72 contains XML based definitions of fields and appropriate formats of those fields. The presentation XML file 72 may be used without modification or additional field type definitions may be added by the developer of the web application 22.

The EJBs 74 are JAVA objects, or business logic objects, which may be developed independently of the web application 22. In general, EJBs 74 are JAVA objects that adhere to a standard framework supporting distributed components and discovery of the properties of the JAVA object. Some of the EJBs 74 may represent tables in the back-end data store 20 and the attributes of these table EJBs 74 represent columns in the tables of the back-end data store 20.

The data store table XML file 76 defines tables in the back-end data store 20. The data store object XML file 78 defines objects stored in the back-end data store 20. The developer may add XML definitions to the data store table XML file 76 and/or the data store object XML file 78 when the web application 22 is concerned with new data tables and/or objects not previously defined.

A portion of an exemplary data store table XML file 76 is provided below:

```
<?xml version="1.0" encoding="UTF-8" ?>
<databases>
<database name="MetamorphosisDB">
<tables>
<table alias="TM_BUSINESS_PROCESS" name="TM_BUSINESS_PROCESS" schema="MORPH_OWN">
<columns>
<column key="primary" name="BUSINESS_PROCESS_ID">
   <nullable>NO</nullable>
   <datatype>NUMBER</datatype>
   <size>9</size>
   <method>businessProcessId</method>
</column>
<column key="foreign" name="BUSINESS_PROCESS_TYPE_CODE">
   <nullable>NO</nullable>
   <datatype>VARCHAR2</datatype>
   <size>3</size>
   <method>businessProcessTypeCode</method>
</column>
<column key="" name="BUSINESS_PROCESS_NAME">
   <nullable>NO</nullable>
   <datatype>VARCHAR2</datatype>
   <size>120</size>
   <method>businessProcessName</method>
</column>
<column key="" name="BUSINESS_PROCESS_DESCRIPTION">
   <nullable>YES</nullable>
   <datatype>VARCHAR2</datatype>
   <size>2048</size>
   <method>businessProcessDescription</method>
</column>
</columns>
</table>
</tables>
</database>
</databases>
```

A portion of an exemplary data store object XML file 78 is provided below:

```
<?xml version="1.0" encoding="UTF-8" ?>
<dataobjects>
<dataobject>
   <name>com.sprint.mm.dao.business.BusinessUnitDetailDAO</name>
   <tables>
   <table name="MORPH_OWN.TM_BUSINESS_UNIT" />
   </tables>
</dataobject>
<dataobject>
   <name>com.sprint.mm.dao.business.BusinessProcess DetailDAO</name>
   <tables>
   <table name="MORPH_OWN.TM_BUSINESS_PROCESS"/>
   </tables>
</dataobject>
<dataobject>
   <name>com.sprint.mm.dao.system.SystemVersion ProcessAssignmentDAO</name>
   <tables>
   <table name="MORPH_OWN.TM_SYSTEM_VERSION_PROCESS" />
   </tables>
</dataobject>
</dataobjects>
```

The data store object XML file 78 identifies classes corresponding to EJBs 74 that may be persisted in the back-end data store 20. The XML definition of each class associates the class, or EJB 74, with a table name and a schema which appear in the data store table XML file 76. The data store table XML file 76 identifies the tables that map to the EJBs 74, columns that map to attributes of the EJBs 74, and methods that map to accessor methods of the EJBs 74. The data store table XML file 76 and the data store object XML file 78 may be used by code in the template servlet 56, in a web application 22 built using the web construction framework, to generate structured query language (SQL) commands dynamically as the web application 22 access objects based on EJBs 74 that are persisted in the back-end data store 20.

The data store table XML file generator tool 82 is a software tool that is operable to generate at least a portion of the data store table XML file 76 based on requesting metadata from the back-end data store 20. The metadata returned from the back-end data store 20 may include table names, column names, identification of primary keys, identification of foreign keys, identification of data types of columns, and identification of data sizes of columns. In an embodiment, the data store table XML file generator tool 82 may search the EJBs 74, identify accessor methods on the EJBs 74, and insert XML text defining the accessor methods into the data store table XML file 76. In an alternate embodiment, the XML text defining accessor methods of the EJBs 74 may be manually inserted into the data store table XML file 76 by enterprise personnel.

The custom XML tag library 80 provides a means for parts of the view element to access the data contained in the EJBs 74. The custom XML tag library 80 may be extended when needed by the developer when the subject web application 22 requires new access behaviors.

The web construction framework is most concisely described with regard to the web application 22 constructed using the web construction framework.

Figure 3:
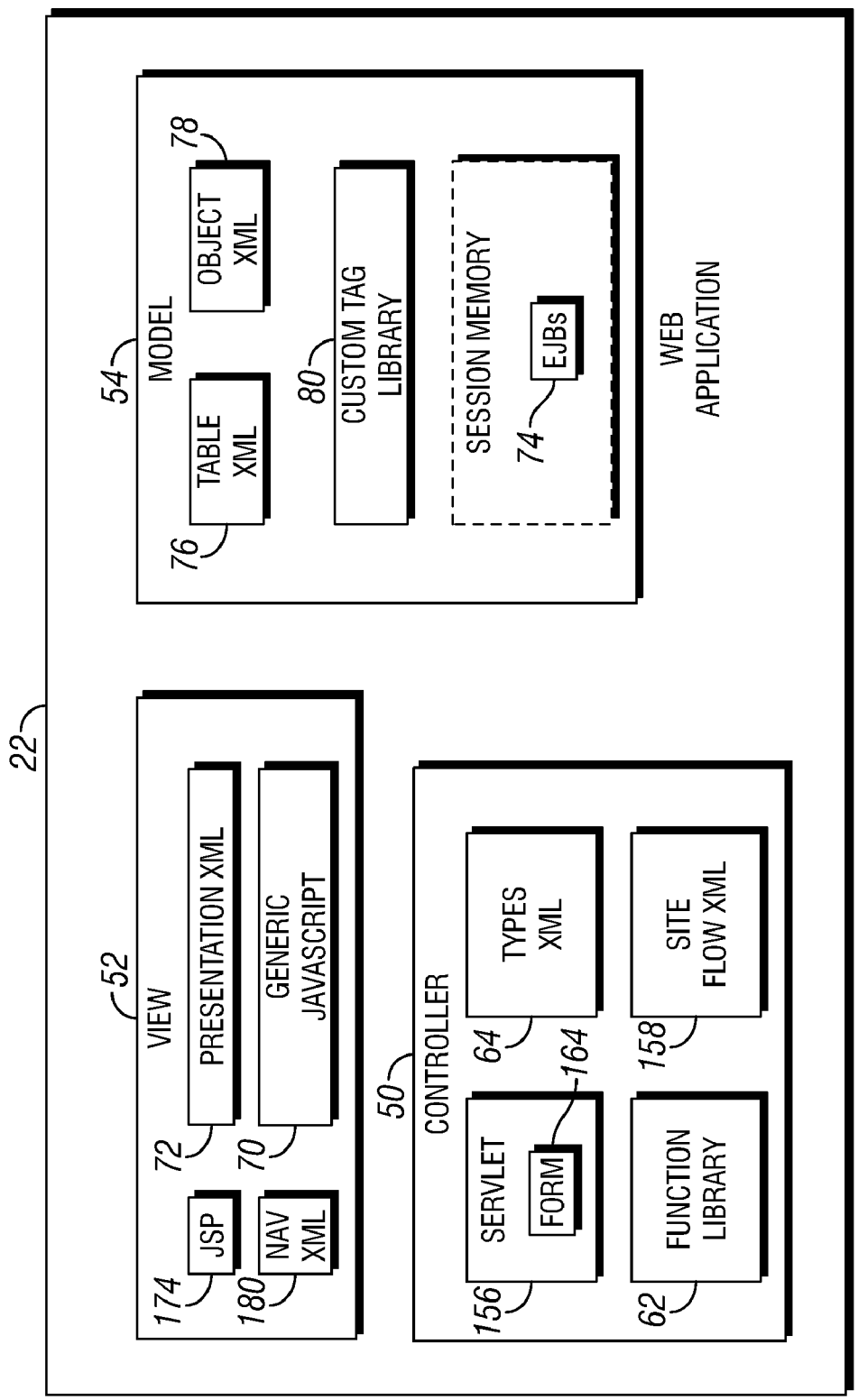
FIG. 3 is a block diagram of a web application constructed according to the web application framework.

Turning now to FIG. 3, a block diagram of the web application 22 built using the web application construction framework of the present disclosure is depicted. The web application 22 is partitioned into the controller elements 50, the view elements 52, and the model elements 54. In the context of the web application 22 built according to the web application construction framework, the functionality enabled by the controller elements 50 of the web application construction framework may be referred to as the controller component 50. Within the web application 22, the view elements 52 of the web application construction framework may be referred to as the view component 52. Within the web application 22, the model elements 54 of the web application construction framework may be referred to as the model component 54. The view component 52 is responsible for defining the screen presentation that will be viewed by the client 12. The controller component 50 is responsible for defining how the web application 22 will respond to requests from the client 12. The controller component 50 also defines the business rules of the web application 22. The model component 54 holds the objects that are used by the web application 22. The objects present in the model component 54 may be persisted or stored on the back-end data store 20.

The general flow of control for the web application 22 provides for a request from the client 12 to be received from the web server 16 by the controller component 50. The controller component 50 processes the request from the client 12 and formulates a response, perhaps accessing object data stored in the model component 54. The controller component 50 sends the response to the view component 52. The view component 52 processes the response from the controller component 50 and creates an HTML document to send to the client 12, via the web server 16.

The controller component 50 comprises a servlet 156, a site flow XML file 158, the XML types file 64, and the function library 62. The site flow XML file 158 may be referred to as a flow file. The XML types file 64 may be referred to as a types file. The servlet 156 is a JAVA servlet based on the template servlet 56 which a developer customizes for the specific application. The servlet 156 includes one or more form instances or form objects 164 derived from the generic form class 60. The form object 164 is an instance of a class that is subclassed or extended from the generic form class 60 by the developer to provide capabilities specific to the web application 22. The generic form class 60 may be subclassed in one or more classes, depending on the requirements of the web application 22.

The servlet 156 includes instructions which may dynamically generate SQL commands when form input is received. When the web application 22 is first loaded, the servlet 156 parses the data store table XML file 76 and the data store object XML file 78 and establishes associations between EJBs 74 and the persistence of objects corresponding to the EJBs 74 in the data store 20. These associations are relied upon by the servlet 156 when dynamically generating SQL commands.

Attributes of the classes derived from the generic form class 60 include field types which define the input from fill-in boxes. A finite number of field types are defined in the XML types file 64. Accessor methods, for example functions that assign and read values of attributes, also known as 'set methods' and 'get methods,' are defined for the field types and provide checking of input values against the definitions of the field types provided in the XML types file 64. Invalid values provided in a set method call, for example when the client 12 forwards an order embedding a 12 digit phone number, result in a request rejection response being forwarded to the view component 52 and thence to the client 12. The XML types file 64 need not be developed for each new web application 22. In the rare case that a new data type is defined for a web application 22, the XML types file 64 is extended by adding the new data type definition. The developer does not need to define accessor methods for a field attribute—these accessor methods are inherited from the field type definition.

The servlet 156 maps the request from the client 12 to an action based on the site flow XML file 158. If the client 12 sends a request to the web application 22 which attempts to jump into the middle of a control sequence, the servlet 156 may map the request from the client 12 to the first screen or view associated with the web application 22, based on the site flow XML file 158. The developer defines the site flow XML file 158 for each different web application 22 based on the template site flow XML file 58. The code in the servlet 156, derived from the template servlet 56, reads the site flow XML file 158 and takes action accordingly and is generic and need not change for the web application 22. Making a change to the site flow XML file 158 causes the behavior of the web application 22 to change after the web application 22 is restarted.

When navigating through typical web sites, web applications 22 may cache previous screens, for example saving the HTML files associated with previous screens, so that the client 12 selecting a back button causes the previous cached screen to display. When navigating through secure web sites, however, caching is typically disabled and the client 12 selecting the back button may cause the display to post a message indicating that an error has occurred. Disabling caching of content in this manner provides a security benefit, but diminishes the user experience. When leaving the secure web site, the web browser back button may not work properly and the user may become confused or alarmed at error messages returned to the browser screen.

The servlet 156 is selectively operable, such as by programming derived from the template servlet 56, to keep track of the sequence of URLs accessed by the web application 22 as well as information, such as input from forms, associated with each of the URLs. When the back button is selected in a secure environment, the servlet 156 maps the action to select the previously selected URL and input associated with that URL. For example, the client 12 may present a second page display that was provided when the client 12 provided a second input and selected a second URL. When the back button on the client 12 is activated, the web application 22 looks up the first URL and first inputs, which were previously stored, and serves the appropriate page that is referenced by the first URL and first input to the client 12, which returns the client 12 to the previous display screen. The servlet 156 may be selected to provide back button functionality for secure pages by a configuration flag provided in a server configuration file. Different web applications 22 may have back button functionality for secure web pages either enabled or disabled by associated configuration flags provided in the server configuration file.

The function library 62 provides a number of functionalities which may be included in the servlet 156. Email templates for notifying administrators of actions are available for inclusion in the servlet 156. Reporting of data in a common document format, such as Microsoft Excel spreadsheet or portable document format (PDF), is available for inclusion in the servlet 156. Cryptography functions are available for inclusion in the servlet 156. File transport protocol (FTP) functionality is available for inclusion in the servlet 156. A timed socket communication functionality is provided which supports establishing communication links with external applications and closes the communication links after a specified time interval passes during which there are no communication exchanges. These and other convenient functionalities are contemplated for inclusion in the servlet 156 and hence into the web application 22 from the function library 62.

The model component 54 comprises a data store object XML file 78, a data store table XML file 76, a custom XML tag library 80, and a plurality of enterprise JAVA beans (EJBs) 74 which are stored in session memory. Session memory is memory allocated to a specific web session. The EJBs 74 in the model component 54 provide local access to data stored in the back-end data store 20. SQL commands to access the back-end data stores 20 are embedded in stored procedures in XML to ease code changes.

The data store table XML file 76 defines tables in the back-end data store 20. The data store object XML file 78 defines objects in the back-end data store 20. The model component 54 is able to access the back-end data store 20 to create and persist EJBs 74, based on the data in the back-end data store 20, using the data store table XML file 76 and the data store object XML file 78. When the web application 22 is loaded, such as for example when the application server 18 is brought into service, the data store table XML file 76 and the data store object XML file 78 are read and analyzed so that when an object is written back to the back-end data store 20, the knowledge of what fields, what tables, and what back-end data store 20 need to be written to is pre-determined. These objects may be said to know how to write themselves to the back-end data store 20. Additionally, the model component 54 attempts to establish a test connection to the back-end data store 20 when the web application 22 is loaded. If the test connection to the back-end data store 20 cannot be established, appropriate notice is provided to support personnel.

The custom XML tag library 80 provides a means for parts of the view component 52 to access the data contained by the EJBs 74. Generally, custom XML tag libraries 80 support data access and other services, such as custom actions presented as tags, which are invoked using XML tags.

The view component 52 comprises one or more JAVA server pages (JSPs) 174, the generic JavaScript 70 which may be included within the JSPs 174, the presentation XML file 72, and a navigation XML file 180. The JSPs 174 are based on the template JSP 66 which is then modified to accommodate the special needs of the specific web application 22. The JSPs 174 may be "zero code" JSPs, for example JSPs 174 which contain no active JAVA code or JavaScript within the JSP 174 (excluding the included generic JavaScript 70). JSPs 174 which contain code may be difficult to debug and to maintain, hence it may be desirable to keep code out of the JSPs 174. The JSPs 174 may be precompiled before installing the web application 22 so that the client 12 may receive a more rapid response than if the JSPs 174 compile when a request from the client 12 is received. When the controller component 50 so directs, one of the JSPs 174 executes and generates the HTML document which is returned to the client 12.

The presentation XML file 72 contains XML based definitions of fields and the appropriate format of those fields. Like the XML types file 64 described above, most of the fields are already defined in the presentation XML file 72, and the developer needs only to add a new field definition to the presentation XML file 72 if a new, previously undefined input field is needed for the web application 22. The generic JavaScript 70 analyzes the presentation XML file 72 to generate input checks for each input field in the JSPs 174 which are executed when one of the JSPs 174 is provided with input. If a field format is not adhered to when providing input, and JavaScript is enabled by the client 12, one of the JSPs 174 rejects the attempt of the client 12 to send the input to the web server 16.

The navigation XML file 180 contains XML based definitions of a user interface, for example a form input page, which are used by the JSPs 174 to provide an interactive graphical user interface to the client 12. The navigation XML file 180 may be based on the template site navigation XML file 68. The navigation XML file 180 permits selection of vertical menus disposed along the left or along the right side of the display or horizontal menus at the top of the display by the use of an attribute within the tag associated with the menu. Ordering of menu elements may be defined by the use of an attribute within the tag associated with the menu. The navigation XML file 180 and the use made of the navigation XML file 180 by the template JSP 66 and the JSPs 174 permit the navigation layout and navigation hierarchy to be changed easily and without modifying code. Because the JSPs 174 are executed on every response returned by the web application 22 to the client 12, any changes to the navigation XML file 180 may be visible to the client 12 when the next response is returned to the client 12. An exemplary navigation XML file 180 and discussion thereof is provided below.

```
<?xml version="1.0" encoding="UTF-8" ?>
 - <!--
   Comments:
   A menu can inherit from a parent menu by placing the
      name of the menu in the parent attribute of the menu.
   By placing a subMenu on the element attribute the parent
      will be used for drop down navigation.
   -->
 - <navigation>
 - <menu name="reports" position="vertical" parent="">
 - <element group="user" sortOrder="4" subMenu="">
    <target>reports</target>
    <label>Reports</label>
    <id>REPORTS</id>
    <title>Report</title>
    <selected_id />
    <deselected_id />
    <selected_class>leftNavLinkSelected</selected_class>
    <deselected_class>leftNavLinkDeselected</deselected_class>
   </element>
 - <element group="user" sortOrder="5" subMenu="">
    <target>#</target>
    <label />
    <id>SEPERATOR</id>
    <title />
    <selected_id />
    <deselected_id />
    <selected_class />
    <deselected_class />
   </element>
 - <element group="user" sortOrder="6" subMenu="">
    <target>logout</target>
    <label>Logout</label>
    <id>LOGOUT</id>
    <title>Logout</title>
    <selected_id />
    <deselected_id />
    <selected_class>leftNavLinkSelected</selected_class>
    <deselected_class>leftNavLinkDeselected</deselected_class>
   </element>
   </menu>
 -   <menu   name="user_admin"   position="vertical"
   parent="reports">
 - <element group="user" sortOrder="0" subMenu="">
    <target>userSearch</target>
    <label>Search Users</label>
    <id>SEARCH_USER</id>
    <title>Search for users</title>
    <selected_id>leftNavLink</selected_id>
    <deselected_id />
```

```
<selected_class>leftNavLinkSelected</selected_class>
<deselected_class>leftNavLinkDeselected</deselected_
class>
  </element>
- <element group="user" sortOrder="1" subMenu="">
  <target>userCreate</target>
  <label>Create User</label>
  <id>CREATE_USER</id>
  <title>Create new user</title>
  <selected_id />
  <deselected_id />
  <selected_class>leftNavLinkSelected</selected_class>
  <deselected_class>leftNavLinkDeselected</deselected_
class>
  </element>
- <element group="user" sortOrder="2" subMenu="">
  <target>#</target>
  <label />
  <id>SEPERATOR</id>
  <title />
  <selected_id />
  <deselected_id />
  <selected_class />
  <deselected_class />
  </element>
  </menu>
- <menu name="vcrNavigation" position="horizontal" parent="">
- <element group="user,admin" sortOrder="1" subMenu="">
  <target>userSearchResultsScroll</target>
  <label>></label>
  <id>vcrForward</id>
  <title>Next</title>
  <selected_id />
  <deselected_id />
  <selected_class />
  <selected_class />
  <deselected_class />
  </element>
- <element group="user,admin" sortOrder="2" subMenu="">
  <target>usersearchResultsScroll</target>
  <label><</label>
  <id>vcrBackward</id>
  <title>Back</title>
  <selected_id />
  <deselected_id />
  <selected_class />
  <selected_class />
  <deselected_class />
  </element>
  </menu>
  </navigation>
```

The <menu></menu> tag pairs surround the definition of a menu which may comprise definitions of multiple menu selections. The "position" attribute identifies the positioning mode employed for placing the menu on the page to be seen by the client 12. The <element></element> tag pairs surround the definition of elements of the menu, for example menu selections. The "group" attribute identifies the class of users that are permitted to view the defined element. The "sortOrder" attribute identifies the relative positioning of the element versus other elements defined for the menu. The "target" attribute ties to the site flow XML file 158. The "label" attribute is the name which will display on the page to be seen by the client 12. The "id" attribute is used to identify the click on the menu item to the servlet 156 and is passed on to the web application 22 when the client 12 clicks on the menu item. The "selected_id", "deselected"id", "selected_class", and "deselected_class" are used to support cascading style sheet (CSS) capabilities.

Figure 4:
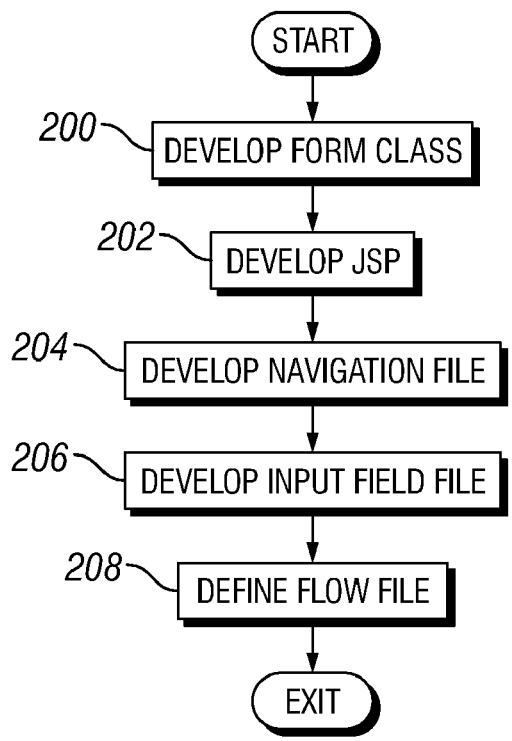
FIG. 4 is a flow chart depicting steps of constructing a web application according to the web application construction framework.

Turning now to FIG. 4, a flow chart depicts a method of creating a new web application 22 according to the web application system 10 described above. In block 200, a form object 164 is derived from the generic form class 60 provided by the web application construction framework. The generic form class 60 is extended by the developer to provide behavior and business logic specific to the requirements of the web application 22.

The method proceeds to block 202 where the JSP 174 is developed based on the JSP template 66. The JSP 174 is related to the form object 164 created in block 200.

The method proceeds to block 204 where the navigation XML file 180 is developed for the web application 22. The navigation XML file 180 may be developed from the template site navigation XML file 68 which provides text comment instructions and examples for developing the navigation XML file 180.

The method proceeds to block 206 where the XML types file 64 is extended by adding new input field definitions, if needed. The method proceed to block 208 where the site flow XML file 158 is developed based on the template site flow XML file 58.

The actions described above may be performed in any sequence. After these steps, the JSP 174 is precompiled and the web application 22 may be built from these modified or new components plus standard components. The web application 22 may then be installed conventionally on the application server 18 and placed into service.

Figure 5:
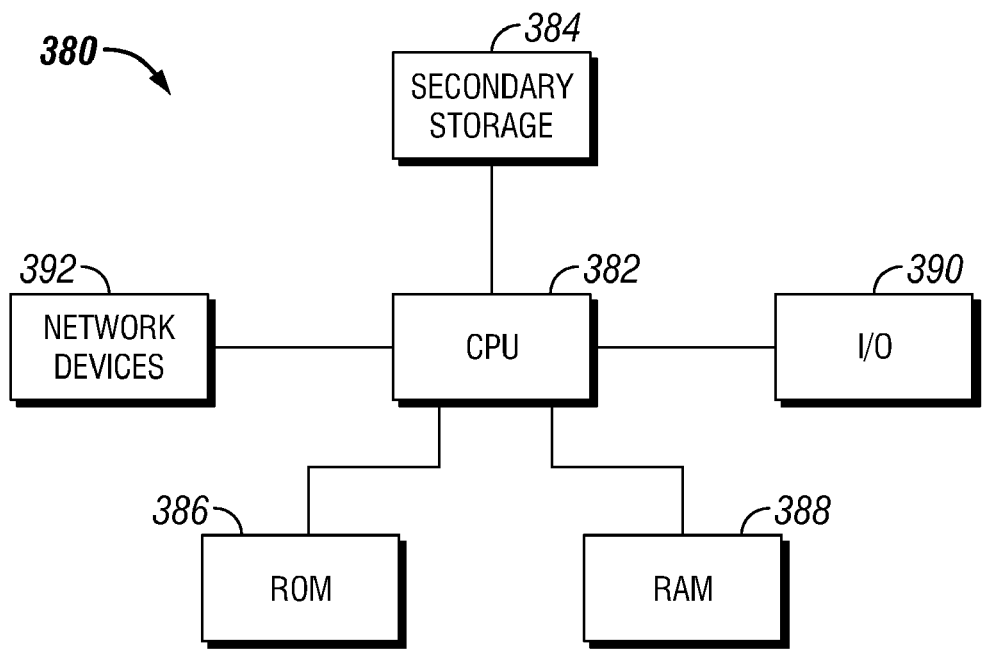
FIG. 5 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several architectural elements of the web application construction framework in the preferred embodiment are provided in XML format, for example the template site flow XML file 58 and the template site navigation XML file 68, the present disclosure also contemplates alternate structured markup language formats and other descriptive formats for use in providing the architectural elements of the web application construction framework.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A system for constructing a controller and a model component of a web application, comprising:
  a plurality of business logic objects stored on a computer readable medium, wherein each of the plurality of business logic objects represents a corresponding table of a data store, and wherein attributes of each of the plurality of business logic objects represent columns in the corresponding table of the data store;
  a table extensible markup language file stored on a computer readable medium that provides extensible markup language definitions of tables of the data store, wherein the extensible markup language definition of each table includes text identifying a table of the data store, text identifying columns of the identified table, and text defining an accessor method of one of the plurality of business logic objects that represent the identified table;
  an object extensible markup language file stored on a computer readable medium that provides extensible markup language definitions of classes persisted in the data store that correspond with the plurality of business logic objects, wherein the extensible markup language definition of each of the classes associates the class with the text identifying the table of the data store which is included in one of the extensible markup language definitions of tables of the data store in the table extensible markup language file;
  wherein the model component comprises the table extensible markup language file, the object extensible markup language file, and at least some of the plurality of business logic objects stored in a session memory allocated to a specific web session of the web application, and wherein the model component, when the web application is executed on a web server, provides local access to data stored in the data store through the at least some of the plurality of business logic objects;
  a site flow file template stored on a computer readable medium, wherein the site flow file template is configured to serve as a baseline for deriving a site flow file that defines a site flow sequence, and
  a servlet template stored on a computer readable medium, wherein the servlet template is configured to serve as a baseline for deriving a servlet;
  wherein the controller component comprises the site flow file and the servlet, and wherein the servlet, when the web application is executed on the web server, parses the table extensible markup language file and the object extensible markup language file, and establishes associations between the at least some of the plurality of business logic objects and corresponding objects persisted in the data store, wherein the servlet further receives a request from a client application, processes the request based on the site flow file, and accesses data through the model component to generate a response to the request, and when accessing the corresponding objects persisted in the data store, the servlet dynamically generates SQL commands based on the associations.

2. The system of claim 1 wherein the site flow file template is an extensible markup language file.

3. The system of claim 1 wherein the data store is further defined as a back-end data store system.

4. The system of claim 1 wherein the model component further includes a library containing custom tags.

5. The system of claim 1 wherein the controller component further includes a types extensible markup language file that defines a plurality of data types and wherein the servlet validates input to an input field based on the types extensible markup language file.

6. The system of claim 1 wherein the servlet contains at least one form object, wherein each of the at least one form object is derived from a generic form class.

7. The system of claim 1 wherein the controller component further includes a function library providing a plurality of utilities for use by the servlet.

8. The system of claim 7 wherein the function library provides an email capability.

9. The system of claim 8 wherein the email capability includes email form letter templates.

10. The system of claim 7 wherein the function library provides a file transport protocol capability.

11. The system of claim 7 wherein the function library provides a timed communication channel capability, whereby when the servlet establishes a communication link with an external application, the communication link is automatically taken down after an interval of time passes in which no communication takes place over the communication link.

12. The system of claim 7 wherein the function library provides cryptography functions.

13. The system of claim 12 wherein the cryptography functions support a DES standard, a triple DES standard, a PGP encryption, and a Blowfish encryption.

14. The system of claim 1 wherein the model component further includes a plurality of stored procedures in extensible markup language, wherein each stored procedure encodes a data store access operation.

15. The system of claim 14 wherein the data store access operation is a structured query language command.

16. The system of claim 1, further comprising a table extensible markup language file generator tool configured to generate at least a portion of the table extensible markup language file.

17. The system of claim 1, wherein the model component is further configured to attempt to establish a test connection to the data store and to provide appropriate notice to support personnel when the attempted test connection to the data store is not established.

18. The system of claim 1, wherein the servlet is further configured to receive a first input and a first universal reference locator to a secure web site via a client, store the first input and the first universal reference locator, display, via the client, a first secure page of the secure web site in response to the first input and the first universal reference locator, navigate to a second secure page, display, via the client, the second secure page, provide the first input and the first universal reference locator to the secure web site in response to selecting, via the client, to return to the first secure page, and display the first secure page in accordance with the first input via the client.

19. A method of constructing a controller component and a model component of a web application using a web construction framework, the method comprising:
developing a servlet derived from a servlet template;
developing a site flow file which is derived from a site flow file template, the site flow file defining a site control flow sequence;
providing a plurality of business logic objects, wherein each of the plurality of business logic objects represents a corresponding table of a data store, and wherein attributes of each of the plurality of business logic objects represent columns in the corresponding table of the data store;
providing a table extensible markup language file that provides extensible markup language definitions of tables of the data store, wherein the extensible markup language definition of each table includes text identifying a table of the data store, text identifying columns of the identified table, and text defining an accessor method of one of the plurality of business logic objects that represent the identified table;
providing an object extensible markup language file that provides extensible markup language definitions of classes persisted in the data store that correspond with the plurality of business logic objects, wherein the extensible markup language definition of each of the classes associates the class with the text identifying the table of the data store which is included in one of the extensible markup language definitions of tables of the data store in the table extensible markup language file;
constructing the model component, wherein the model component comprises the table extensible markup language file, the object extensible markup language file, and at least some of the plurality of business logic objects stored in a session memory allocated to a specific web session of the web application, and wherein the model component, when the web application is executed on a web server, provides local access to data stored in the data store through the at least some of the plurality of business logic objects; and
constructing the controller component, wherein the controller component comprises the site flow file and the servlet, and wherein the servlet, when the web application is executed on the web server, parses the table extensible markup language file and the object extensible markup language file and establishes associations between the at least some of the plurality of business logic objects and corresponding objects persisted in the data store, wherein the servlet further receives a request from a client application, processes the request based on the site flow file, and accesses data through the model component to generate a response to the request, and when accessing the corresponding objects persisted in the data store, the servlet dynamically generates SQL commands based on the associations.

20. The method of claim 19 wherein the site flow file is an extensible markup language file.

21. The method of claim 19 further including developing an at least one stored procedure in extensible markup language encoding a data store access operation.

22. The method of claim 21 wherein the data store access operation is a structured query language command.

23. A web construction framework for constructing a controller component, a model component, and a presentation component of a web application, comprising:
a plurality of business logic objects stored on a computer readable medium, wherein each of the plurality of business logic objects represents a corresponding table of a data store, wherein attributes of each of the plurality of business logic objects represent columns in the corresponding table of the data store;
a table extensible markup language file stored on a computer readable medium that provides extensible markup language definitions of tables of the data store, wherein the extensible markup language definition of each table includes text identifying a table of the data store, text identifying columns of the identified table, and text defining an accessor method of one of the plurality of business logic objects that represent the identified table;

an object extensible markup language file stored on a computer readable medium that provides extensible markup language definitions of classes persisted in the data store that correspond with the plurality of business logic objects, wherein the extensible markup language definition of each of the classes associates the class with the text identifying the table of the data store which is included in one of the extensible markup language definitions of tables of the data store in the table extensible markup language file;

wherein the model component comprises the table extensible markup language file, the object extensible markup language file, and at least some of the plurality of business logic objects stored in a session memory allocated to a specific web session of the web application, and wherein the model component, when the web application is executed by a web server, provides local access to data stored in the data store through the at least some of the plurality of business logic objects;

a site flow file template stored on a computer readable medium, wherein the site flow file template is configured to serve as a baseline for deriving a site flow file that defines a site flow sequence, and a servlet template stored on a computer readable medium, wherein the servlet template is configured to serve as a baseline for deriving a servlet;

wherein the controller component comprises the site flow file and the servlet, and wherein the servlet, when the web application is executed by the web server, parses the table extensible markup language file and the object extensible markup language file and establishes associations between the at least some of the plurality of business logic objects and corresponding objects persisted in the data store, wherein the servlet further receives a request from a client application, processes the request based on the site flow file, and accesses data through the model component to generate a response to the request, and when accessing the corresponding objects persisted in the data store, the servlet dynamically generates SQL commands based on the associations;

an input field file stored on a computer readable medium defining a plurality of input field types and associated field formats;

a server page template stored on a computer readable medium, the server page template is configured to serve as a baseline for deriving a server page;

a script configured stored on a computer readable medium, that when executed by a processor, analyzes the input filed file, generates an input check based on the associated field formats, and installs the input check in the server page;

wherein the presentation component of the web application comprises the server page, and wherein the server page, when the web application is executed on the web server and is accessed by a client browser, generates a hypertext markup language file including input fields validated by the input check based on the associated field format that the web application returns to the web browser.

24. The web construction framework of claim 23 further comprising a navigation extensible markup language file defining an application navigation.

25. The web construction framework of claim 24 wherein the server page is further configured to define at least one menu into the hypertext markup language file using the navigation extensible markup language file.

26. The web construction framework of claim 25 wherein the server page defines the at least one menu by placing tags in the hypertext markup language file.

27. The system of claim 23 wherein the site flow file template is an extensible markup language file.

28. The system of claim 23 wherein the data store is further defined as a back-end data store system.

29. The system of claim 23 wherein the model component further includes a library containing custom tags.

30. The system of claim 23 wherein the controller component further includes a types extensible markup language file that defines a plurality of data types and wherein the servlet validates input to the input fields based on the types extensible markup language file.

* * * * *